3,528,141
SPRING-BIASED LOCKING MECHANISM WITH
HYDRAULIC RELEASE
Ronald E. Andersen and John A. Dorumsgaard, Minneapolis, and Loren E. Swanson, St. Paul, Minn., assignors to Central Engineering Company, Minneapolis, Minn., a corporation of Minnesota
Filed Sept. 25, 1968, Ser. No. 762,574
Int. Cl. A44b 17/00
U.S. Cl. 24—211                                              8 Claims

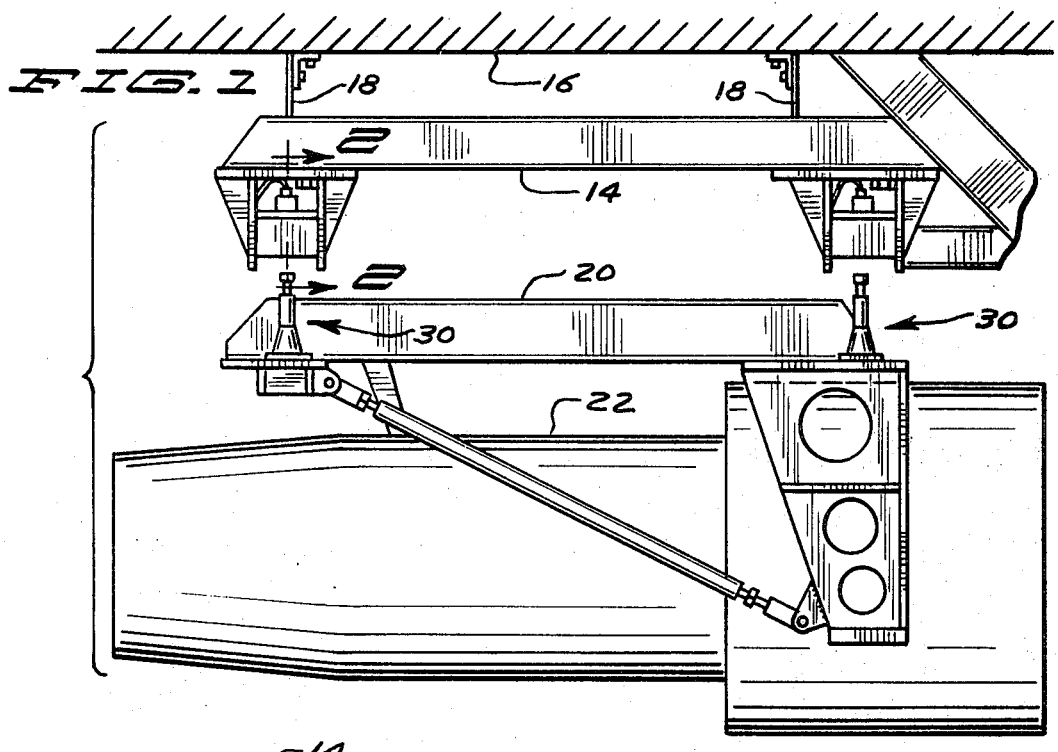
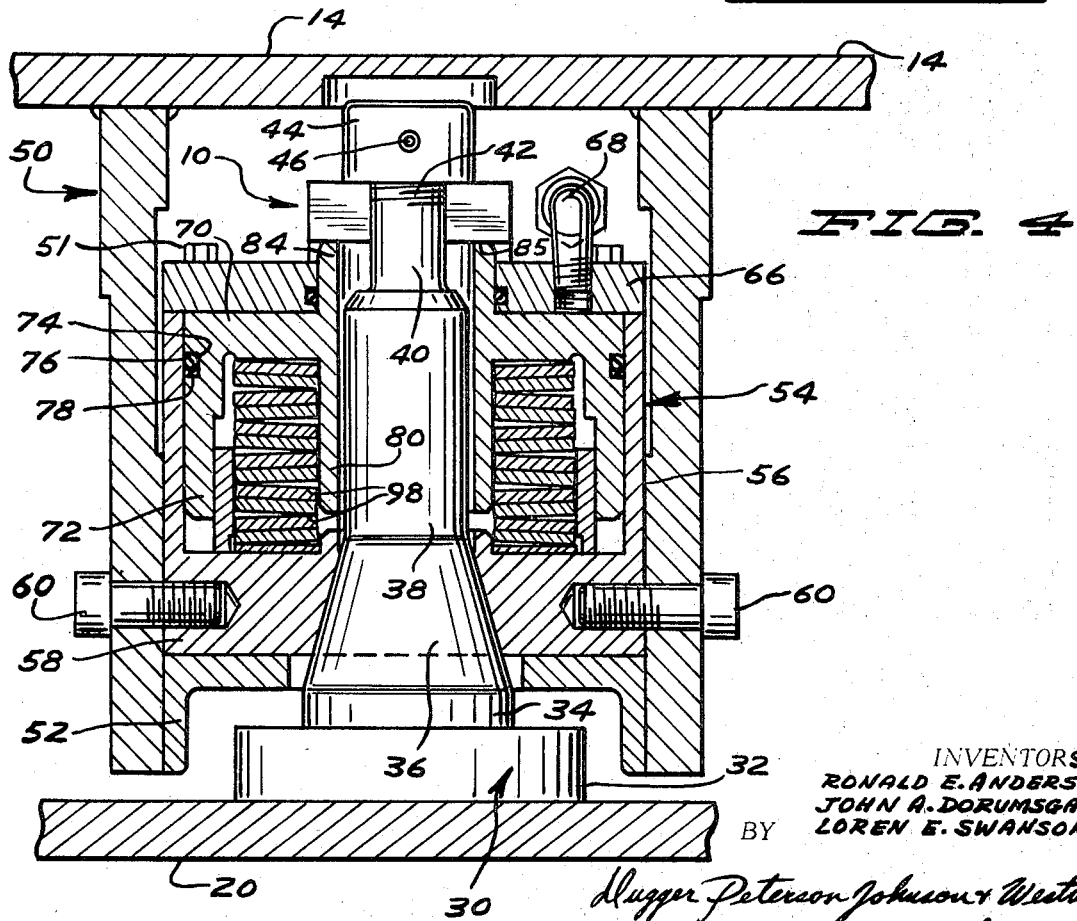

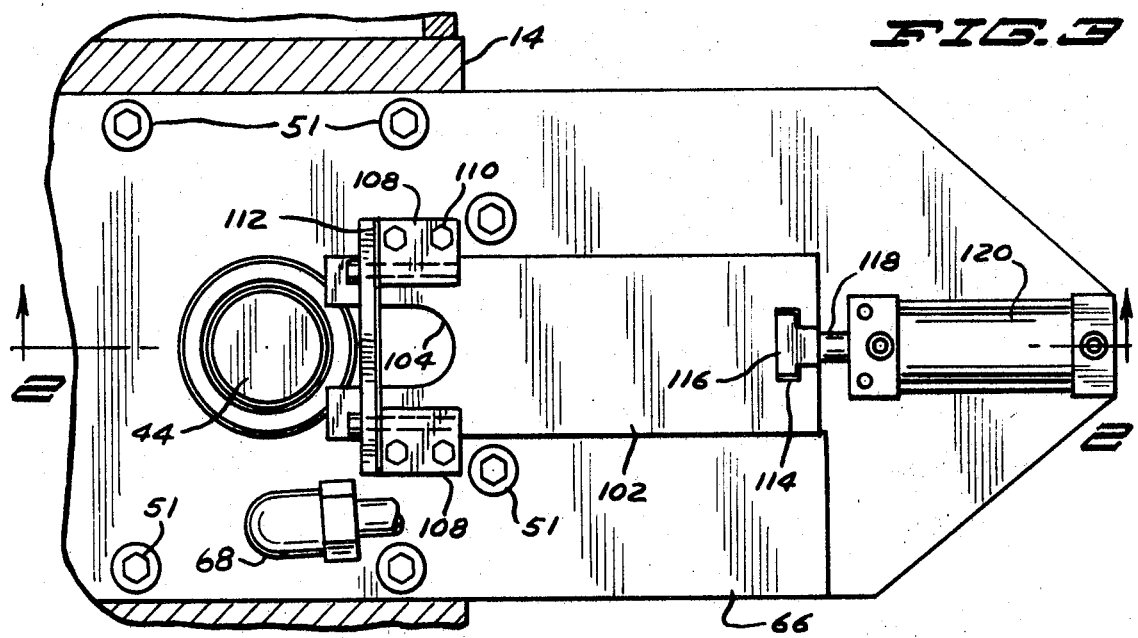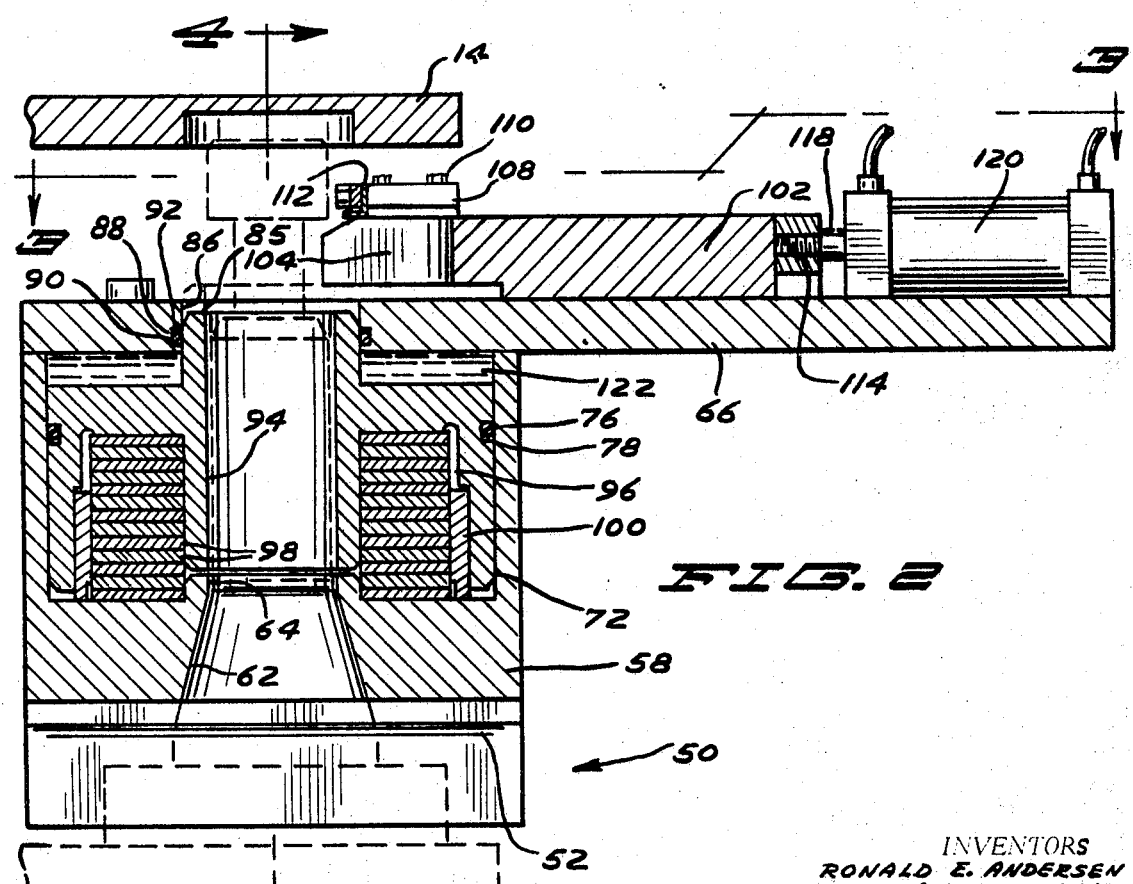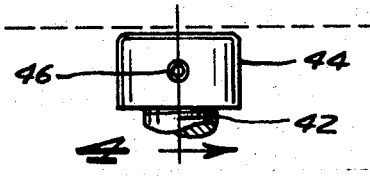

ABSTRACT OF THE DISCLOSURE

At least one disc spring normally biases a piston in one direction to cause a sliding latch to be securely locked in place. To unlock or release the sliding latch, fluid under pressure is forced against the piston to overcome the action of the disc spring or springs.

BACKGROUND OF THE INVENTION

Field of the invention

This invention relates generally to locking mechanisms, and pertains more particularly to a locking mechanism that is hydraulically or pneumatically fail safe, normally being securely locked by spring action and released by fluid action.

Description of the prior art

Various locking mechanisms have been heretofore devised. The known mechanisms coming closest to the present invention have been of the key or slotted type, but such mechanisms have been limited as to their utility. More specifically, the prior art arrangements have been of a lightweight construction and have not involved a sufficient clamping action and have been completely devoid of a suitable hydraulic or pneumatic release. It should be explained at this stage that certain applications demand a positive assurance that an unlocking of the mechanism will not inadvertently occur and allow damage to ensue with respect to the two structures that should be securely held together. More specifically, as an example, in the testing of jet engines, the engine undergoing test must be securely held in place even when subjected to considerable vibration, yet the engine should be capable of being readily released when the test has been completed. Hence, the present invention will find especial utility in such an environment.

SUMMARY OF THE INVENTION

One important object of the invention is to provide a locking mechanism that will be hydraulically or pneumatically fail safe, as the case may be, fluid pressure being required only to effect the release of the mechanism. More specifically, the invention has for an aim the utilization of a plurality or stack of disc springs, although it is within the contemplation of the invention to employ but one such spring, that normally maintain the mechanism in a locked condition so that any failure in the fluid system will not allow the structures or parts to become unclamped that should be held securely together.

Another object of the invention is to provide a locking mechanism that produces an evenly distributed locking force. In this regard, a cone bolt is attached to one of the structures to be held with another structure and the clamping pressure is caused to be concentric with the cone bolt.

Another object of the invention is to provide a locking mechanism that will be compact and which can be manufactured at a relatively low cost.

Yet another object of the invention is to provide a locking mechanism that will produce an accurate alignment of the structures or parts to be connected together, the alignment occurring automatically as the two structures are moved relatively toward each other.

A further object of the invention is to provide a rugged locking mechanism that can withstand appreciable vibration and thereby be completely reliable even though employed in adverse environmental situations.

Briefly stated, the present invention envisages the utilization of one or more disc springs, commonly referred to as Belleville washers, which act against one side of a clamping piston so as to maintain latching engagement with a slidable bar or strip. A slot in the end of the slidable strip receives therein a portion of a cone bolt having a nut carried at one end, thereby preventing withdrawal of the cone bolt until hydraulic or pneumatic fluid is forced against the other side of the piston to overcome the action of the spring discs. Hence, the locking mechanism is hydraulically or pneumatically fail safe.

BRIEF DESCRIPTION OF THE DRAWINGS

FIG. 1 is a side elevational view of a jet engine attached to a conventional adapter which is in the process of being hoisted upwardly into engagement with a ceiling-suspended thrust stand, portions of two locking mechanisms being visible in this particular view;

FIG. 2 is a sectional view taken in the direction of line 2—2 of FIG. 1 and in the direction of line 2—2 of FIG. 3, the view illustrating the constructional details of one of the locking mechanisms appearing in FIG. 1;

FIG. 3 is a top plan view taken in the direction of line 3—3 of FIG. 2, and

FIG. 4 is a sectional view similar to FIG. 2 but depicting the mechanism in a locked condition.

DESCRIPTION OF THE PREFERRED EMBODIMENT

The locking mechanism exemplifying the present invention has been denoted generally by the reference numeral 10. However, in order to appreciate the benefits to be derived from the use of such a locking mechanism, it will be seen in FIG. 1 that a thrust stand 14 has been illustrated which is suspended from a ceiling 16 by means of a pair of flexible plates 18. An engine adapter 20 is attached to an aircraft gas turbine 22 which is to be tested. As pictured in FIG. 1, the adapter 20 is in the process of being hoisted or elevated upwardly to effect engagement between the adapter 20 which constitutes one structure to be held and the thrust stand which constitutes the other structure.

Solely as background information, it can be pointed out that a number of adapters 20 will be made available and that any particular adapter 20 can be attached to an engine 22 well in advance of the time that the engine is to be tested. Hence, when a jet engine is to be tested, all that need be done is to raise the particular adapter 20 that has been secured thereto so that it can be raised into testing position and held in position by the thrust stand 14. As the description progresses, it will be appreciated that the parts comprising each of the locking mechanisms will automatically move into alignment and will be securely locked together during the ensuing testing procedure.

With the foregoing in mind, the details of one of the locking mechanisms 10 will now be given. First, it will be noted that a cone bolt 30 is employed, two such cone bolts 30 appearing in FIG. 1 since two locking mechanisms 10 are visible. Actually, four such locking mechanisms are in use as far as the arrangement depicted in FIG. 1 is concerned.

The cone bolt 30, as can be seen from FIGS. 1 and 4, is attached at its lower end to the engine adapter 20, projecting upwardly therefrom. The cone bolt 30 in each instance includes a base portion 32, this being the portion that is affixed to the adapter 20. Immediately above the base portion 32 is a circular or cylindrical portion 34 as can be best seen in FIG. 4 because of the larger scale of this particular figure. Continuing upwardly from the portion 34 is a frusto-conical portion 36 that tapers into a cylindrical body portion 38. Above the cylindrical body portion 38 is a neck portion 40 of reduced diameter which is formed with a threaded upper end 42. Attached to the threaded end 42 is a head or nut 44 that serves a purpose presently to be referred to. A set screw 46 assuring that the nut 44 does not work itself loose and therefore performs its expected function.

Constituting an accessory as far as the locking mechanism 10 is concerned is a supporting unit 50 that is part of the underside of the thrust stand 14. At the lower end of the supporting unit 50 is a channel retainer 52 holding in place what will be termed a socket unit 54. The socket unit 54 includes a cylinder 56 having its lower end 58 resting on the retainer 52 and anchored by screws 60 extending inwardly through the sides of the supporting unit 50.

It is the lower end 58 of the cylinder 56 that is formed with a frusto-conical bore portion 62 that conforms to the portion 36 on the cone bolt 30. Circumscribing the upper or smaller end of the conical bore 62 is an annular lip or flange 64 integral with the bottom of wall 58. The cylinder 56 also has an upper plate 66 that serves to close the upper end of the cylinder, bolts 51 maintaining the assembled relation of these parts. The plate 66 has an elbow fitting 68 attached thereto so that hydraulic or pneumatic fluid under pressure can be introduced into the cylinder 56 for a purpose hereinafter explained.

Within the cylinder 56 is a reciprocably disposed piston 70 having an outer wall or skirt 72 formed with a circumferential groove 74 containing therein a resilient O-ring 76 and a back-up ring 78. The piston 70 also includes an inner wall or tubular portion labeled 80 which forms an annular or cup-shaped recess therein. Projecting upwardly from the piston 70 is a collar means 84 providing an annular clamping portion at 85, this collar means 84 and its clamping portion 85 being integral with the piston 70 so that the collar 84 and its portion 85 move in unison.

It is to be discerned that the collar 84 extends through a circular opening 86 in the plate 66 that otherwise closes the upper end of the cylinder 56. An internal groove 88 is formed in the plate 66, the groove 88 containing a resilient O-ring 90 and a back-up ring 92 that perform a sealing function in the same general fashion as does the resilient ring 76 and its back-up ring 78.

A cylindrical bore 94 extends upwardly through the inner wall or tubular portion 80, continuing upwardly through the tubular portion or collar 84. It is within the bore 94 that the cylindrical body 38 of the cone bolt 30 resides when the mechanism is in its locked condition.

An annular space 96 is formed between the outer wall or skirt 72 and the inner wall or portion 80, the space 96 serving to contain a plurality or stack of disc springs 98, these being the springs that are commonly referred to as Belleville washers. A spring guide 100 in the form of a sleeve is disposed in the space 96 and functions, as its name implies, as a guide means for keeping the various disc springs 98 in proper relation.

Attention is now directed to a slidable latch bar or strip 102 having a notch or slot 104 in the one end thereof. The width of the notch 104 is such as to accommodate or receive therein the neck portion 40 of the cone bolt 30. The slide strip 102 is constrained for reciprocal movement transversely of the cone bolt 30 by means of guide blocks 108 which are affixed to the plate 66 through the agency of a number of screws 110 appearing in FIGS. 2 and 3. Overlying the strip 102 is a wiper or bridging member 112. At the end opposite the slot 104 is a T-shaped slot 114 in which is contained a T nut 116 mounted on the end of a piston rod 118. The piston rod 118 extends into an air or hydraulic cylinder 120 also mounted on the plate 66.

OPERATION

Having presented the foregoing description, the manner in which our locking mechanism 10 functions will now be given. With the piston 70 projected upwardly under the influence of the various disc springs 98, the piston 70 will assume the position illustrated in FIG. 4. To overcome the spring action, hydraulic or gas fluid under pressure is introduced into the upper end of the cylinder 56 through the elbow fitting 68. The pressure will force the piston 70 downwardly, comprising the various disc springs 98 so that they become flattened as illustrated in FIG. 2.

It is at this time that the locking mechanism 10 is in a condition so that the cone bolt 30 can be moved upwardly from the position in which it appears in FIG. 2 into the position in which it appears in FIG. 4. Also, the slidable latching strip 102 is retracted by the piston rod 118 belonging to the cylinder 120 so that there will be no interference with the upward insertion of the cone bolt 30. The nut 44 readily moves through the lower opening 62 and continues upwardly through the bore 94 until it reaches the phantom outline position depicted in FIG. 2, this being the same position shown in solid outline in FIG. 4. It will be appreciated that due to the frusto-conical configuration imparted to the portion 36 of the cone bolt 30 there will be an automatic or self-alignment that takes place with respect to the complementally configured opening 62 in the lower end of the cylinder 56. Consequently, there is no necessity for orienting the bolt 30, the alignment taking place without any particular attention from the operator.

Once the cone bolt 30 has been fully inserted so that the frusto-conical portion 36 bears against the complemental bore 62, this being its locking position, then the slide strip 102 can be moved from its position shown in FIGS. 2 and 3 to the left so that the slot 104 moves into registry with the neck portion 40 of the now fully received cone bolt 30. Although taken at an angle of 90° from that in which FIG. 2 is presented, it will be perceived from FIG. 4 that the neck portion 40 is received within the slot 104 and that the nut 44 then prevents retraction of the cone bolt 30 downwardly.

It will be understood that hydraulic fluid 122 under sufficient pressure, as illustrated in FIG. 2, overcomes the biasing action of the various disc springs 98. When the hydraulic pressure is either removed or reduced sufficiently, however, the springs 98 then force the piston 70 upwardly into the position in which it is illustrated in FIG. 4. This action results in the integral portion 84 engaging the underside of the strip 102 to force the strip upwardly against the nut 44. Since the nut 44 is threadedly attached to the cone bolt 30, more specifically the neck portion 40 thereof, the cone bolt is held tightly. Hence, the locking action is a positive one and is in no way dependent upon the presence of fluid 122 in the upper end of the cylinder 56. It is due solely to the action of the various disc springs 98 that the clamping engagement is maintained.

It will be understood that the T-shaped slot 114 and the T nut 116 allow whatever upward movement of the strip 102 that is necessary to effect the clamping action. Since the amount of lifting or upward movement of the strip 102 can be quite minimal, none has been shown. In practice, though, this movement might be on the order of 1/16 inch or so. Also, all of the fluid 122 need not be forced out of the cylinder 56 as has been depicted in FIG. 4. In this regard, it is preferred that some fluid remain so that the piston 70 will not abut the plate 66 before the clamping of the strip 102 is accomplished; additionally, having some fluid still contained in the upper end of the cylinder 56, that is, between the piston 70 and the plate 66 facilitates the subsequent release of the strip 102 as explained below.

When the adapter 20 and the attached engine 22 are to be lowered, then the forcing of hydraulic fluid 122 back into the upper end of the cylinder 56 will result in the forcing of the piston 70 downwardly. The action is facilitated, as mentioned above, because if there is some fluid 122 already present, the hydraulic pressure needed to overcome the spring bias is immediately applied over the entire upper area of the piston 70 rather than initially only over the area beneath the fitting 68. The springs 98 in this way are forced to resume the flattened condition shown in FIG. 2. Under these circumstances, the strip 102 can be pulled to the right as viewed in FIGS. 2 and 3 with the consequence that the slot 104 is no longer in registry with the neck portion 40 of the cone bolt 30. This allows the cone bolt 30 to move downwardly, the locking mechanism 10 under these circumstances now being unlocked so that the two structures 14 and 20 can be readily separated from each other.

We claim:

1. A mechanism for locking two structures together comprising a cylinder adapted to be anchored to one of the structures, said cylinder having an opening at one end, a piston reciprocably disposed within said cylinder, means movable by said piston having a clamping portion thereon, means adapted to be anchored to the other of the two structures, latch means engageable with said last-mentioned means, spring means normally biasing said piston in one direction to cause said clamping portion to clamp said latch means, and means for introducing fluid into said cylinder to move said piston in a direction opposite to said one direction to overcome the biasing action of said spring means to effect release of said latch means.

2. A locking mechanism in accordance with claim 1 in which said spring means includes at least one resilient washer contained within said cylinder.

3. A mechanism in accordance with claim 2 in which said latch means includes a transversely movable strip having a slot at one end and a cone bolt having an enlarged end and a neck portion of a size to be received within said slot, said clamping portion engaging said strip to force said strip against said enlarged end when said neck portion is received in said slot.

4. A mechanism for locking two structures together comprising a cylinder adapted to be anchored to one of the structures, said cylinder having an opening at one end, a bolt member adapted to be anchored at one end to the other of the two structures and having a neck portion of reduced cross-section near its opposite end, a movable latch strip having a slot therein of a width to accommodate said neck portion so as to prevent withdrawal of said bolt member relative said cylinder when said slot is in registry with said neck portion, a piston reciprocably disposed within said cylinder, clamping means movable in unison with said piston for engaging said latch strip when said slot is in registry with said neck portion, at least one spring washer normally biasing said piston into clamping engagement with said latch strip, and means for introducing fluid into said cylinder to overcome the biasing action of said spring washer to force said piston in an opposite direction to release said latch strip so that said strip may be shifted in a direction to move said slot out of registry with said neck portion so that said bolt member may be withdrawn relative said cylinder and thus unlock the two structures.

5. A locking mechanism in accordance with claim 4 in which said bolt member has a tapered portion near its said one end, and means fixedly associated with respect to said cylinder forming a complementally tapered bore.

6. A locking mechanism in accordance with claim 5 including a nut member threadedly carried on said opposite end of the bolt member which bears against said latch strip to prevent withdrawal of said bolt member when said slot is registered with said neck portion.

7. A locking mechanism in accordance with claim 6 in which said piston is provided with a tubular portion, said tubular portion projecting in an opposite direction from said first tubular portion and there being a stack of spring washers with a majority of said spring washers encircling said tubular portion.

8. A locking mechanism in accordance with claim 7 in which said piston is provided with an outer wall concentric with said tubular portion, said mechanism including a guide sleeve disposed between said outer wall and at least some of said spring washers.

References Cited

UNITED STATES PATENTS 2,580,495  1/1952  Woods.
3,302,963  2/1967  Rochfort.

KENNETH DOWNEY, Primary Examiner